(12) United States Patent
Spruit et al.

(10) Patent No.: US 7,221,643 B2
(45) Date of Patent: *May 22, 2007

(54) REWRITABLE DATA STORAGE MEDIUM HAVING ERASABLE IDENTIFICATION MARKS

(75) Inventors: Johannes Hendrikus Maria Spruit, Eindhoven (NL); Johan Cornelis Talstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/244,682

(22) Filed: Oct. 6, 2005

(65) Prior Publication Data

US 2006/0039269 A1    Feb. 23, 2006

Related U.S. Application Data

(63) Continuation of application No. 09/790,185, filed on Feb. 22, 2001, now Pat. No. 6,986,150.

(30) Foreign Application Priority Data

Feb. 23, 2000  (EP) ............................... 00200613
Jun. 30, 2000  (EP) ............................... 00202296

(51) Int. Cl.
*G11B 7/24*  (2006.01)

(52) U.S. Cl. ................................. 369/275.4; 720/718

(58) Field of Classification Search ............ 369/275.2, 369/275.4; 720/718; *G11B 7/24*
See application file for complete search history.

(56) References Cited

U.S. PATENT DOCUMENTS

| | | | | |
|---|---|---|---|---|
| 4,277,071 A | * | 7/1981 | Birt et al. ........................ | 369/84 |
| 4,677,604 A | * | 6/1987 | Selby, III et al. ...... | 369/52.1 X |
| 5,119,363 A | * | 6/1992 | Satoh et al. ........... | 369/52.1 X |
| 5,126,741 A | * | 6/1992 | Yoshida ...................... | 341/155 |
| 5,400,319 A | * | 3/1995 | Fite et al. .............. | 369/52.1 X |
| 5,587,984 A | * | 12/1996 | Owa et al. ........... | 369/275.5 X |
| 5,706,047 A | * | 1/1998 | Lentz et al. ................. | 347/262 |
| 5,706,266 A | * | 1/1998 | Brownstein et al. ..... | 369/53.21 |

(Continued)

FOREIGN PATENT DOCUMENTS

JP       11-025464       1/1999

(Continued)

OTHER PUBLICATIONS

Ozaki Kazuhisa, "Optical Disk and Reproducing Device", Apr. 1999, vol. 1999, No. 4.

*Primary Examiner*—A M Psitos
(74) *Attorney, Agent, or Firm*—Michael E. Belk

(57) ABSTRACT

A rewritable data storage medium has a rewritable recording layer provided with a tracking structure. The recording layer has a data recording area. An erasable identification mark is present in an identification mark area other than the data recording area. The data recording area has a first tracking structure, whereas the identification mark area is substantially free from a tracking structure or has a second tracking structure substantially different from the first tracking structure, such as including concentric or interrupted spiral grooves. Thus erasure of the identification mark is practically impossible, because the location of the erasing spot of a recorder cannot be controlled precisely in radial direction in the identification mark area.

6 Claims, 3 Drawing Sheets

U.S. PATENT DOCUMENTS 5,751,671 A * 5/1998 Koike et al. ............... 369/84 X
5,805,551 A * 9/1998 Oshima et al. ...... 369/53.21 X
5,822,291 A * 10/1998 Brindze et al. ................ 369/94
5,907,144 A * 5/1999 Poon et al. ............ 235/462.08
6,070,799 A * 6/2000 Ashe ....................... 235/462.1
6,104,686 A * 8/2000 Whitcher et al. ...... 369/52.1 X
6,222,697 B1 * 4/2001 Ottesen et al. ................ 360/75
6,266,299 B1 * 7/2001 Oshima et al.

FOREIGN PATENT DOCUMENTS

WO      WO98/27553    *   6/1998

* cited by examiner

REWRITABLE DATA STORAGE MEDIUM HAVING ERASABLE IDENTIFICATION MARKS This is a continuation of prior application Ser. No. 09/790,185 filed Feb. 22, 2001, and issued as U.S. Pat. No. 6,986,150.

The invention relates to a rewritable data storage medium, having a rewritable recording layer provided with a tracking tracks, said layer having a data recording area, and an erasable identification mark which is present in an identification mark area other the data recording area and which extends over a radial width of several track of the tracking structure in the data recording area.

Said rewritable data storage medium is known from Japanese patent application JP-09073666-A. The known medium is an optical recording medium. Optically readable patterns are written outside the data recording area of the recording layer. The patterns are readable with the naked eye or by machine and may serve as an identification mark.

Rewritable data storage, and particularly rewritable recording in optical recording media, is currently finding increasing use in the high-density storage of large quantities of data. In the optical recording medium, the information is retrieved through the interaction of a radiation beam, e.g. a focused laser beam, with the optical recording medium. A recently introduced type of optical storage medium has the capability to have information recorded on the medium after its manufacture. In addition, at a later time, the stored information can be erased or modified. This type of optical storage medium, in the disc embodiment, is generally referred to as an erasable or a rewritable optical storage disc. Examples are CD-rewritable (RW), DVD-RW, DVD+RW, DVD-random access memory (RAM), and digital video recording (DVR)-red and blue disc, where red and blue refer to the wavelength of the radiation beam, e.g. recording and reading laser beam.

The rewritable optical recording disc has a recording layer that is responsive to radiation having a relatively high power level. The impinging radiation changes properties of the recording layer. These property changes are detected optically through the interaction with an impinging radiation beam of relatively low power level and data encoded by means of the property changes can be recovered. For example intensity or polarization changes of the reflected radiation may be detected by a photo diode and converted into electrical signals. The electrical signals are subsequently converted to a format, which can be conveniently manipulated by a signal processing system.

In order to provide copy protection security for the data stored on a storage medium, a need has been felt for a technique for providing an optical storage medium which has an identification mark. This identification mark is applied to every piece of storage medium, e.g. optical disc. The identification mark may for example be a bar code, representing a serial number. During recording of copy-protected content, the data is encrypted with a key that is based on this identification mark. This prevents so-called bit copying or cloning of the disc. Examples are copy protection for recordable media (CPRM) for DVD-RAM and possibly DVD-RW. During copying of the encrypted content, which is present in the data recording area, the identification mark of the original is not copied to the target medium. The empty target medium has another identification mark, which already was applied to it during its manufacture. A player which reads the cloned medium is not able to construct the correct original decryption key, since it is necessarily based on the identification mark of the clone, which is not the correct identification mark belonging to the copied content. In order to place the correct identification mark of the original disc, a hacker first has to erase the identification mark of the empty disc and subsequently to write an identification mark that corresponds to the encrypted data.

An important requirement of the identification mark is that it can be applied to the recordable/rewritable media at low cost, during the manufacturing process. A possibility is the ablative writing of an unerasable identification mark, e.g. a "bar-code"-style mark, by means of a YAG-laser in the so called Burst Cutting Area (BCA) from radius 22.3 to 23.5 mm, as proposed for DVD-ROM. Such a laser is hardly used because of its cost and the risk of contamination due to the ablative writing with such a laser. An alternative is the Narrow Burst Cutting Area (NBCA), which is feasible for CD-RW, DVD-RW, DVD+RW, DVD-RAM and DVR red or blue. This NBCA covers a relatively narrow zone, e.g. from radius 22.7 to 23.5 mm, for writing an erasable identification mark compared to the non-erasable identification mark in the BCA. A phase change recording layer, which is used for these media, can be applied by vapor depositing or sputtering. The recording layer thus deposited is amorphous and exhibits a low reflection. In order to obtain a suitable recording layer having a high reflection, the data recording area of this layer must first be completely crystallized, which is commonly referred to as initialization, and which takes place in the final phase in production of each medium. This is performed in a production apparatus called an initializer, in which a laser beam scans and heats the moving recording layer to a temperature below its melting temperature but above its recrystallization temperature, causing the amorphous recording layer to crystallize. This production apparatus crystallizes a path that has a radial width of many tracks of the tracking structure. The whole data recording area must be crystallized which is accomplished by moving the initializer beam in radial direction while rotating the medium. However, at the inner and the outer regions of the disc, e.g. for DVD+RW within a radius of 23.5 mm and beyond a radius of 58.5 mm, the disc may be partially crystallized by using a pulsed laser beam in the initializer. So an identification mark, e.g. bar code pattern, may be written outside the data recording area. By starting the pulse sequence locked to the revolution of the disc and rotating the disk in constant angular velocity (CAV) mode, the identification mark is written on the disc. Production costs are negligibly small, because the identification mark is written during initialization and adds only a few percent of time to only this process step. The identification mark is erasable because it is written using the same or the inverse property change of the recording layer as is used for user data recording.

The optical quality and the uniformity of the layers of the disc within 23.5 mm and beyond 58.5 mm is generally worse than in the data recording area. Therefore, it is preferred to use a low-density pattern in order to have reliable detection.

Generally the initialization laser beam is rectangle-shaped and measures approximately 1 micrometer in tangential direction and 100 micrometers in radial direction. Writing an identification mark has been demonstrated for DVD-RW and DVD+RW. Since writing an identification mark is part of the already required initialization step, it is an attractive and economic method.

According to said Japanese application an identification mark is written during initialization, as in the description above, of a phase change type rewritable optical recording medium.

It is a disadvantage of the known medium described in said application that a consumer optical disc recorder can erase the identification mark relatively easily. Such a recorder contains a write laser that may be used to erase, overwrite or change the identification mark. The identification mark is written in an area that is accessible for read out by a consumer recorder. By changing the firmware controlling the recorder drive and by positioning the laser write/read head, the identification mark may be erased by moving the write/read head to the exact position of the identification mark, and another identification mark may be written belonging to the illegally copied content of a source disc. In such a manner a hacker may bypass the copy protection function of the identification mark.

It is an object of the invention to provide a data storage medium of the kind described in the opening paragraph in which the erasure of an identification mark by a consumer apparatus suitable for recording on, rewriting on and reading from a data storage medium is counteracted.

This object is achieved in that the data recording area has a first tracking structure, whereas the identification mark area is substantially free from a tracking structure or has a second tracking structure substantially different from the first tracking structure. Due to the absence or modification of the second tracking structure in the identification mark area, erasure of the identification mark by a consumer recorder is counteracted and tracking of the laser head and performing an erasing action consistently for several tracks in the same manner as in the data recording area is generally impossible. The identification mark usually spans a distance in radial direction, which corresponds to hundreds of tracks of the tracking structure in the data recording area. In this document, the word several may signify anything in the range from a few to hundreds.

In a favorable embodiment the identification mark area is substantially free from a tracking structure. The tracking structure, or any other means used to "guide" the writing head during recording, is very shallow or even absent. The tracking structure of the data recording area may partially be present in the identification mark area, e.g. adjoining the data recording area, and abruptly stop when e.g. moving radially inward. This is a very elegant and easily implemented embodiment of the medium according to the present invention. A consumer recorder is generally not able to track in the identification mark area, so that consistent writing or erasing is almost impossible. Because a consumer recorder writing spot typically has a diameter of approximately 0.5 to 1 micrometer it can not erase the identification mark, which e.g. may be 0.8 mm wide in radial direction, in a single revolution of the disc. The recorder would have to erase consistently for hundreds of revolutions, while moving the laser head in a radial direction. The laser head in the recorder can only turn approximate circles relative to the disc, because the identification mark area is substantially free from a tracking structure. Due to the fact that there are always tolerance deviations in both the disc, and the head-positioning mechanism, the laser spot can not or hardly erase/rewrite the identification mark fully and consistently. Because only approximate circles are described during read out of the identification mark, the width of said mark will necessarily span the total available space, e.g. 0.8 mm in radial direction, of the identification mark area in order to cope with these tolerances. During reading of the identification mark, the absence of a tracking structure in the identification mark area is no problem because the player puts its read head roughly, at a predefined position, in the middle of the identification mark area, and revolves the disc once, reading the reflectivity change, or any other detectable property, in the meantime. Since the identification mark may have a low spatial frequency compared to the user data, e.g. only a few hundred bits in the single revolution, it is no problem when the curve described by the read-out spot deviates from an ideal circular shape, e.g. is eccentric.

In another embodiment the second tracking structure comprises at least one track in the shape of a spiral groove that is interrupted at at least one location. When, in the identification mark area, this spiral is interrupted the read/write head will "loose" tracking and consistent erasure or writing of an identification mark is almost impossible. Preferably the spiral is interrupted at various locations, which causes the laser head to "loose" tracking frequently. Such a modified tracking structure can be obtained relatively easily by interrupting the laser that is used in the manufacture of the tracking structure in the same manner.

In another embodiment the second tracking structure comprises a plurality of tracks in the shape of concentric grooves. When concentric grooves are used instead of a spiral, the laser beam remains in one concentric groove during tracking. Because the concentric groove is closed into itself, the position of the laser head, generating the laser beam, does not change in a radial direction relative to the disc, while tracking. The write laser beam of a consumer recorder drive erasing or writing into the identification mark area, follows the groove back into itself, much like a needle at the very end of the former 45 rpm vinyl record. Due to the concentric grooves, the consumer disc recorder cannot erase the identification mark that e.g. spans at least a few hundred tracks. Erasure of a fraction of the identification mark above one concentric groove is possible but the remaining portion of the identification mark above the adjacent concentric grooves remains intact. It is extremely difficult, or almost impossible, for a consumer to position the laser beam in every concentric groove containing a portion of an identification mark. Read out of the identification mark is performed as described above when the identification mark area is substantially free from a tracking structure. However, during read out of the identification mark, it may be advantageous to put the read head in tracking mode. This has as its result that the radial width of the identification mark may be much smaller, e.g. only a few tens of tracks. It is then assumed that this narrower identification mark is written during manufacture of the disc while a special head that writes the identification mark is subsequently tracking in several concentric grooves. This requires a special tracking servo system that is not available in a consumer recorder.

Many combinations of zones with and without tracking structures are possible. Even zones with tracks which are identical to those used in the data recording area may be present in the identification mark area. Especially the zone adjoining the data recording area may still contain some tracks that are identical to those used in the data recording area. It is even possible to write the identification mark at the outer radius of a rewritable data storage medium outside the data recording area with all the variations of embodiments described in this document.

In a refinement of the embodiments at least one track of the second tracking structure is modulated with address information. This address information can be an encoded radial position number, a track number or another reference signal. Examples of encoded address information in a tracking structure are a phase or frequency modulated track wobble and relatively shortly interrupted grooves with pit headers. The latter does not cause the laser head to loose tracking. The advantage of such address information is that a read/write head of a production apparatus, by reading the address information, can determine its position on the medium precisely and that during production of the data storage medium according to the invention the writing of the identification mark can be performed in a well defined location. Special hard- and software in a production apparatus enables writing of an identification mark in modified tracking structures, e.g. concentric or interrupted spiral grooves with address information. Extra production time is relatively low compared to the total production time of the medium. E.g. writing 20 tracks with an identification mark does not require more than 1 sec of time at a typical rotation speed of 25 Hz. It is emphasized that the special hard- and software in the production apparatus is not available in a consumer recorder that therefore will not be able to erase or write an identification mark.

The recording layer generally comprises a material being able to change between an amorphous and a crystalline state and the recorded information in the recording layer generally is optically readable. Presently, this is the most widely used technique for rewritable optical recording.

In an embodiment the recording layer comprises a magnetic material being able to change between a first and a second magnetization state. The recorded information in the recording layer is magnetically and/or optically readable. Read out of the magnetic state of the magnetic recording layer may be performed with a magnetic read head which floats closely above said magnetic recording layer. Read out of the magnetic state of the magnetic recording layer may also be performed optically by detecting a small rotation of the linear polarization state of an impinging laser beam after reflection at the magnetic recording layer surface. The direction in which rotation of the polarization occurs depends on the local magnetic field, e.g. magnetization state, of the recording layer. This effect is known as Kerr rotation.

The invention is applicable to all kinds of rewritable media in which a property of the recording layer can be changed reversibly and in which a tracking structure is used to guide a read and write device which generates physical energy in order to record or read said property changes. The description of the drawings given hereafter relates to a rewritable optical recording medium, having an amorphous and a crystalline state recording layer, but this is not a limitation.

Embodiments of the data storage medium according to the invention will be described with reference to the drawings. It should be noted that drawings are not to scale. For instance track distances are drawn much larger than they generally are.

In the drawings:

FIG. 1 schematically shows the top view of the data storage medium in which a central area 20 is indicated which is shown enlarged in FIGS. 3 to 5.

Figure 1:
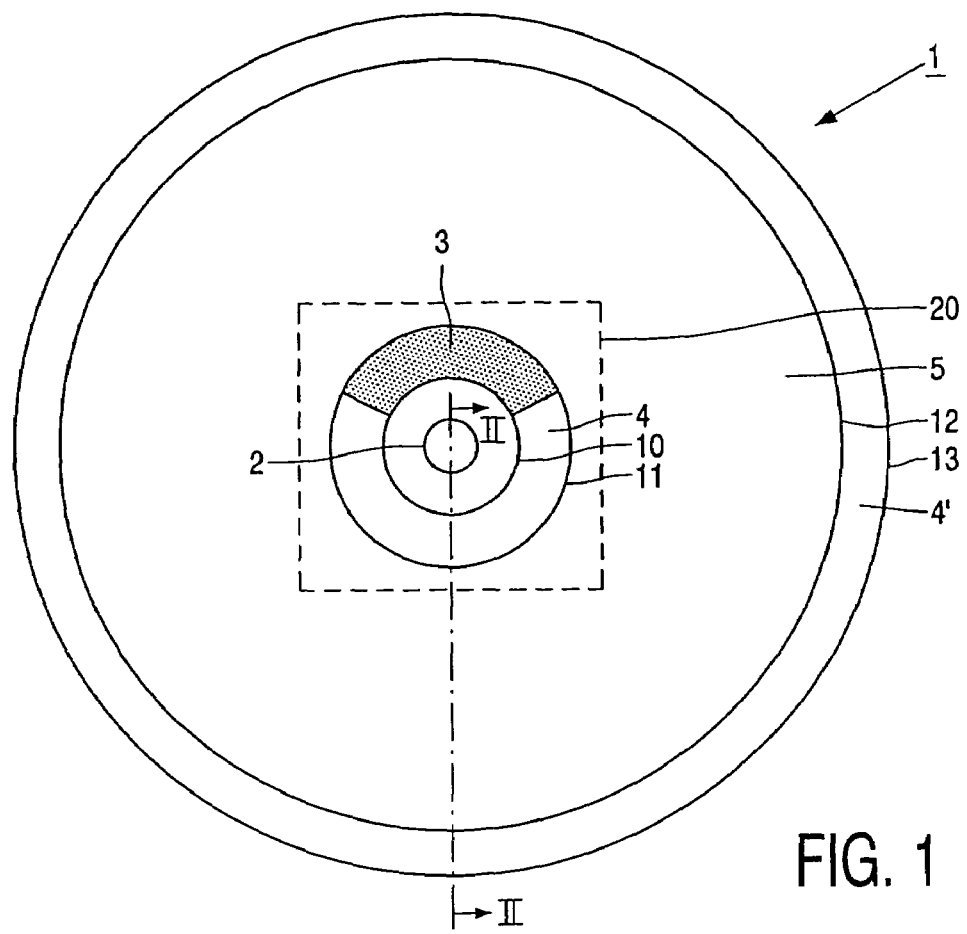
Figure 2:
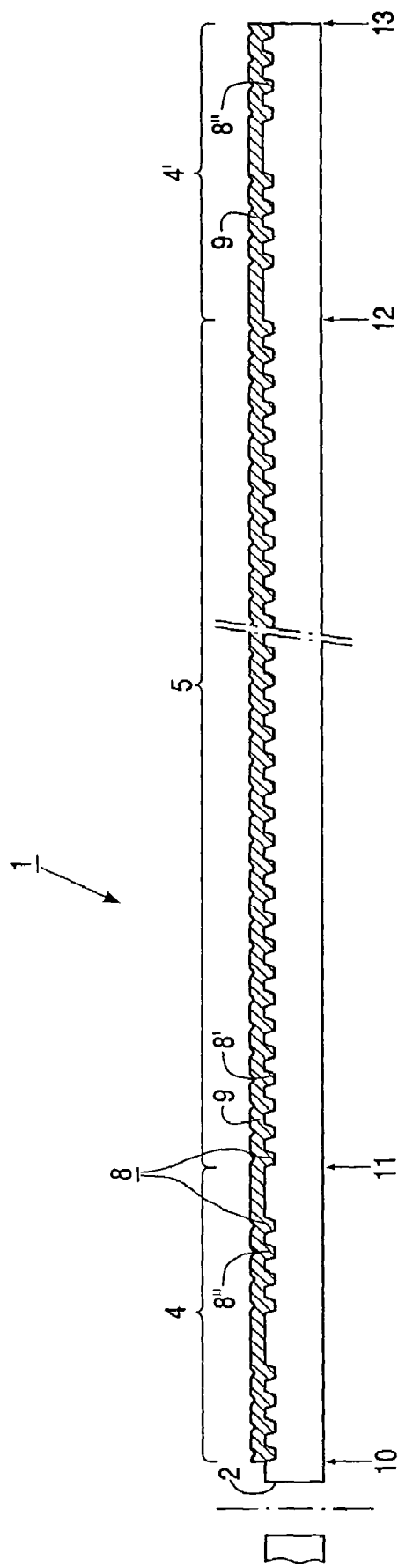
FIG. 2 shows a cross section along the line II—II as indicated in FIG. 1 of the data storage medium representing the embodiment of FIG. 5.

In FIGS. 1 and 2 a rewritable data storage medium 1 is shown, which has a rewritable recording layer 9 provided with a tracking structure 8 having tracks. The recording layer 9 has a data recording area 5, and an erasable identification mark 3 which is present in an identification mark area 4 other than the data recording area 5. The identification mark 3 extends over a radial width of several hundred tracks of the tracking structure 8 in the data recording area 5. The data recording area 5 has a first tracking structure 8', whereas the identification mark area 4 is substantially free from a tracking structure or has a second tracking structure 8" substantially different from the first tracking structure 8'.

The rewritable data storage medium 1 may be an optical data storage medium which has a rewritable recording layer 9 consisting of material being able to change between an amorphous and a crystalline state. These types of storage media are generally referred to as phase change type optical recording discs. The storage medium has a center hole with an inner periphery 2. The recording layer 9 is present between a circle, indicated with reference numeral 10, and the outer periphery 13. In area 5, between circles indicated by 11 and 12, a first tracking structure 8' is present which is used to guide a laser write/read head for writing/erasing data in the data recording area 5 by an end user of the optical data storage medium 1. Another possibility is that during production of the medium 1 data, e.g. licensed software which may be sold together with the medium 1 to an end user, is recorded in area 5. Area 4, between circles indicated by 10 and 11, contains an identification mark 3 that is written during production of the data storage medium 1. The identification mark 3 consists of areas with low and high optical reflection, which correspond to the respective amorphous and crystalline state of the recording layer 9. The identification mark 3 may also be present in area 4' between radius 12 and the outer periphery 13 of the disc, in which case the descriptions of tracking structures given for area 4 are applicable accordingly. The identification mark 3, e.g. a bar code, may represent a serial number. During recording of copy-protected content by a manufacturer in area 5, the data is encrypted with a key that is based on this serial number. Data can only be decrypted when the serial number, represented by the identification mark, corresponds to the key of the data.

Figure 3:
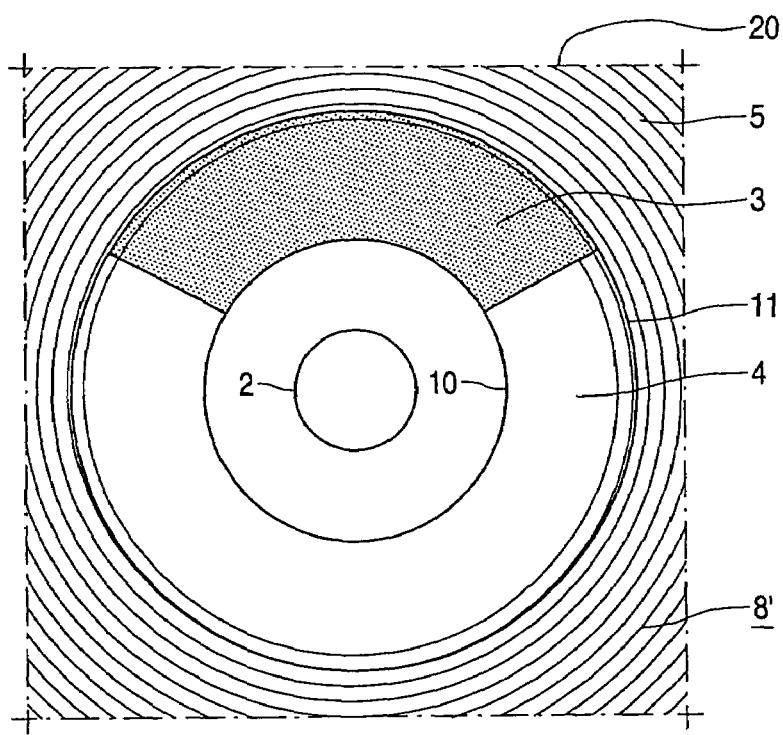
FIG. 3 shows an enlarged view of the square area 20 of FIG. 1 of the data storage medium representing a first embodiment.

In FIG. 3 the identification mark area 4 is substantially free from a tracking structure. The identification mark area 4 may still contain a portion, e.g. adjoining the data recording area 5, with a continuation of the first tracking structure 8' of the data recording area. An identification mark 3 is present in the identification mark area 4. The absence of a tracking structure in the major portion of the identification mark area 4 prevents tracking of the laser read/write head of an optical recorder and consistent erasure of the identification mark 3.

Figure 4:
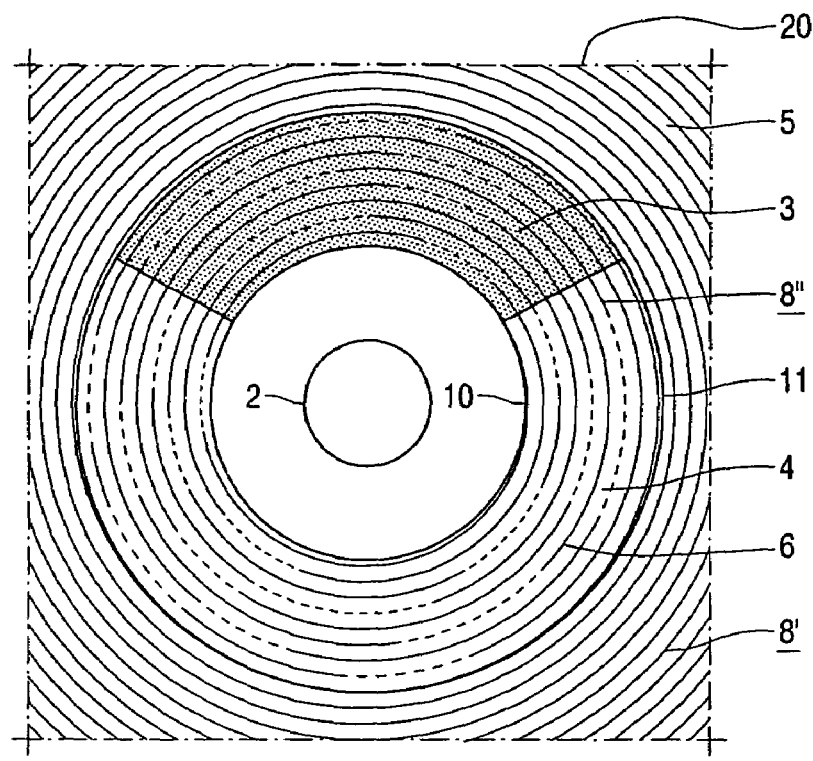
FIG. 4 shows an enlarged view of the square area 20 of FIG. 1 of the data storage medium representing a second embodiment.

In FIG. 4 the second tracking structure 8" comprises at least one track 6 in the shape of a spiral groove that is interrupted at at least one location. In this embodiment a spiral groove is interrupted at several locations. Tracking by the laser read/write head is not possible in the interrupted areas and thus consistent erasure of the identification mark 3 is counteracted.

Figure 5:
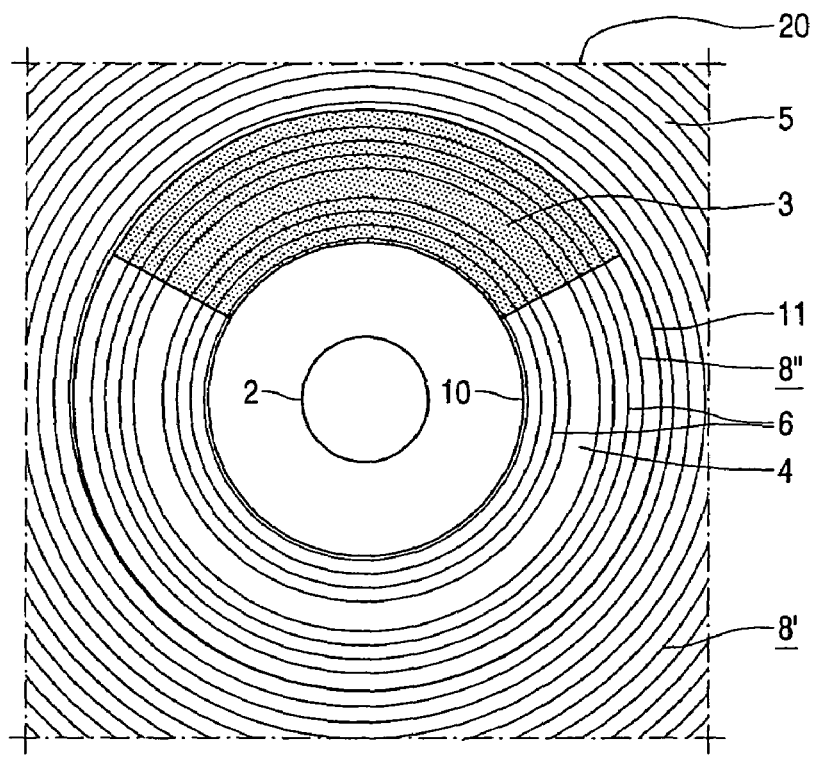
FIG. 5 shows an enlarged view of the square area 20 of FIG. 1 of the data storage medium representing a third embodiment.

In FIG. 5 the second tracking structure 8" comprises a plurality of tracks 6 in the shape of concentric grooves. The laser read/write head will remain locked in one concentric groove during tracking. The fraction of identification mark 3 just above this concentric groove can be erased but the major portion of the identification mark 3 above all other concentric grooves and non-grooved areas remains intact.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising", "comprise" or "comprises" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

According to the invention an erasable data storage medium is provided, which has an erasable identification mark which is present in an identification mark area other than the data recording area. The data recording area has a first tracking structure, whereas the identification mark area is substantially free from a tracking structure or has a second tracking structure substantially different from the first tracking structure, by which erasure of the identification mark by a consumer data storage recorder is counteracted.

The invention claimed is:

1. A data storage medium, comprising:
   a recording layer having a data recording area and a different identification mark area; and
   an erasable identification mark in the identification mark area, the identification mark area having a radial width approximately equal to several tracks of a first tracking structure in the data recording area, and the identification mark area having a second tracking structure substantially different from the first tracking structure.

2. The data storage medium of claim 1, wherein the second tracking structure comprises at least one track in the shape of a spiral groove that is interrupted in at least one location.

3. The data storage medium of claim 1, wherein the second tracking structure comprises a plurality of tracks in the shape of concentric grooves.

4. The data storage medium of claim 2, wherein the at least one track of the second tracking structure is modulated with address information.

5. The data storage medium of claim 1, wherein the recording layer comprises a magnetic material being able to change between a first and a second magnetization state, and wherein the recorded information in the recording layer is readable as selected from the group consisting of magnetically readable, optically readable and combinations thereof.

6. The data storage medium of claim 1 wherein the recording layer including the identification mark is rewritable.

* * * * *